(12) United States Patent
Perkinson (10) Patent No.: US 7,751,212 B2
(45) Date of Patent: Jul. 6, 2010

(54) METHODS AND APPARATUS FOR THREE-PHASE RECTIFIER WITH LOWER VOLTAGE SWITCHES

(75) Inventor: Joseph C. Perkinson, Nashua, NH (US)

(73) Assignee: Raytheon Company, Waltham, MA (US)

( * ) Notice: Subject to any disclaimer, the term of this patent is extended or adjusted under 35 U.S.C. 154(b) by 420 days.

(21) Appl. No.: 11/738,660

(22) Filed: Apr. 23, 2007

(65) Prior Publication Data

US 2008/0259663 A1 Oct. 23, 2008

(51) Int. Cl.
*H02M 7/217* (2006.01)
(52) U.S. Cl. .......................................... 363/127; 363/37
(58) Field of Classification Search .................. 363/35, 363/84, 85, 87, 89, 125, 126, 127, 128, 129
See application file for complete search history.

(56) References Cited

U.S. PATENT DOCUMENTS

| 5,644,483 A * | 7/1997 | Peng et al. ..................... 363/37 |
| 2003/0128563 A1* | 7/2003 | Rojas Romero .............. 363/89 |
| 2008/0013352 A1* | 1/2008 | Baker ......................... 363/125 |

FOREIGN PATENT DOCUMENTS

| EP | 0 660 498 A2 | 12/1994 |
| EP | 0 660 498 A3 | 12/1994 |
| WO | WO 99/49559 A2 | 3/1999 |
| WO | WO 99/49559 A3 | 3/1999 |
| WO | WO 01/47094 A2 | 6/2001 |
| WO | WO 01/47094 A3 | 6/2001 |

OTHER PUBLICATIONS

Gules et al; A Switched-Mode Three-Phase Three-Level Telecommunications Rectifier; 1999; Department of Electrical Engineering, Power Electronics Institute, Florianopolis, SC, Brazil, pp. 1-7.*
Corzine, et al.; "Reduced Parts-Count Multi-Level Rectifiers"; IEEE; 2001; pp. 589-596.
Soto, et al.; "Multi-Level Converters and Large Power Inverters"; Conference Publication No. 429, IEE, Sep. 23-25, 1996; pp. 354-359.
Wu, et al.; "A PDM Controlled Series Resonant Multi-level Converter Applied for X-ray Generators"; IEEE; Apr. 1999; pp. 1177-1182.
Kolar, et al.; "Design and Experimental Investigation of a Three-Phase High Power Density High Efficiency Unity Power Factor PWM (VIENNA) Rectifier Employing a Novel Integrated Power Semiconductor Module"; IEEE; Jul. 1996; pp. 514-523.

(Continued)

*Primary Examiner*—Harry Behm
*Assistant Examiner*—Matthew Grubb
(74) *Attorney, Agent, or Firm*—Daly, Crowley, Mofford & Durkee, LLP (57) ABSTRACT

Methods and apparatus to provide a rectifier having a high power factor not limited by voltage ratings of switching devices. Methods and apparatus can include pairs of series-coupled switches coupled to a respective phase signal to, along with respective diode pairs, apportion voltage over a series of load capacitors coupled across the rectifier DC output terminals.

19 Claims, 8 Drawing Sheets

OTHER PUBLICATIONS

Minibock, et al.; "A Novel Concept for Mains Voltage Proportional Input Current Shaping of a VIENNA Rectifier Eliminating Controller Multipliers"; Feb. 2001; pp. 582-586.
Qiao, et al.; "Three-phase Unity-Power-Factor VIENNA Rectifier with Unified Constant-frequency Integration Control"; IEEE; Sep. 2000; pp. 125-130.
Drofenik, et al.; "Thermal Analysis of a Multi-Chip Si/SiC-Power Module for Realization of a Bridge Leg of a 10kW Vienna Rectifier"; IEICE/IEEE INTELEC; Oct. 19-23, 2003; pp. 826-833.
Ide, et al; "Enhanced Control Scheme for Three-Phase Three-Level Rectifiers at Partial Load"; IEEE Transactions on Industrial Electronics, vol. 52, No. 3; Jun. 2005; pp. 719-726.
Kolar, et al.; "A Novel Three-Phase Utility Interface Minimizing Line Current Harmonics of High-Power Telecommunications Rectifier Modules"; IEEE; Apr. 1994; pp. 367-374.
Stogerer, et al.; "A Novel Concept for Mains Voltage Proportional Input Current Shaping of a VIENNA Rectifier Eliminating Controller Multipliers"; IEEE; Feb. 2001; pp. 587-591.
Dalessandro, et al.; "A Novel Hysteresis Current Control for Three-Phase Three-Level PWM Rectifiers"; IEEE; Jan. 2005; pp. 501-507.
Stogerer, et al.; "Implementation of a Novel Control Concept for Reliable Operation of a VIENNA Rectifier under Heavily Unbalanced Mains Voltage Conditions"; IEEE; Aug. 2001; pp. 1333-1338.
Kolar, et al.; "A New Concept for Reconstruction of the Input Phase Currents of a Three-Phase/Switch/Level PWM (VIENNA) Rectifier Based on Neutral Point Current Measurement"; IEEE; Jun. 2000; pp. 139-146.
Kolar, et al.; "A Novel Three-Phase Utility Interface Minimizing Line Current Harmonics of High-Power Telecommunications Rectifier Modules"; IEEE Transactions on Industrial Electronics, vol. 44, No. 4; Aug. 1997; pp. 456-467.
Kolar, et al.; "A New Switching Loss Reduced Discontinuous PWM Scheme for a Unidirectional Three-Phase/Switch/Level Boost-Type PWM (VIENNA) Rectifier"; IEEE; Jan. 1999.
Minibock, et al.; "Novel Concept for Mains Voltage Proportional Input Current Shaping of a VIENNA Rectifier Eliminating Controller Multipliers"; IEEE Transactions on Industrial Electronics, vol. 52, No. 1; Feb. 2005; pp. 162-170.
Drofenik, et al.; "Pump Characteristic Based Optimization of a Direct Water Cooling System for a 10-kW/500-kHz Vienna Rectifier"; IEEE Transactions on Power Electronics, vol. 20, No. 3; May 2005; pp. 704-714.
Drofenik, et al.; "Pump Characteristic Based Optimization of a Direct Water Cooling System for a 10-kW/500-kHz Vienna Rectifier"; 2004 35th Annual IEEE Power Electronics Specialists Conference; Jan. 2004; pp. 4894-4900.
Minibock, et al.; "A Novel Concept for Mains Voltage Proportional Input Current Shaping of a VIENNA Rectifier Eliminating Controller Multipliers"; IEEE; Feb. 2001; pp. 582-586.
Minibock, et al.; "Comparative Theoretical and Experimental Evaluation of Bridge Leg Topologies of a Three-Phase Three-Level Unity Power Factor Rectifier"; IEEE; Aug. 2001; pp. 1641-1646.

Drofenik, at al.; "Comparison of Not Synchronized Sawtooth Carrier and Synchronized Triangular Carrier Phase Current Control for the VIENNA Rectifier I"; IEEE; Apr. 1999; pp. 13-19.
Greul, et al.; "Analysis and Comparative Evaluation of a Three-Phase Three-Level Unity Power Factor Y-Rectifier"; IEICE/IEEE INTELEC; Oct. 19-23, 2003; pp. 421-428.
Kolar, et al.; "A New Concept for Minimizing High-Frequency Common-Mode EMI of Three-Phase PWM Rectifier Systems Keeping High Utilization of the Output Voltage"; IEEE; Mar. 2000; pp. 519-527.
Kolar, et al.; "VIENNA Rectifier II—A Novel Single-Stage High-Frequency Isolated Three-Phase PWM Rectifier System"; IEEE Transactions on Industrial Electronics, vol. 46, No. 4; Aug. 1999; pp. 674-691.
Kolar, at al.; "Design and Experimental Investigation of a Three-Phase High Power Density High Efficiency Unity Power Factor PWM (VIENNA) Rectifier Employing a Novel Integrated Power Semiconductor Module"; IEEE; Jul. 1996; pp. 514-523.
Kolar, et al.; "Current Handling Capability of the Neutral Point of a Three-Phase/Switch/Level Boost-Type PWM (VIENNA) Rectifier"; IEEE; Jul. 1996; pp. 1329-1336.
Qiao, et al.; "Three-Phase Unity-Power-Factor Star-Connected Switch (VIENNA) Rectifier With Unified Constant-Frequency Integration Control"; IEEE Transactions on Power Electronics, vol. 18, No. 4; Jul. 2003; pp. 952-957.
Qiao, et al.; "Three-phase Unity-Power-Factor VIENNA Rectifier with Unified Constant-frequency Integration Control"; IEEE; Sep. 2000; pp. 125-130.
Kolar, et al.; "VIENNA Rectifier II—A Novel Single-Stage High-Frequency Isolated Three-Phase PWM Rectifier System"; IEEE; Sep. 1998; pp. 23-33.
Carlton, et al.; "Multi-Level, Uni-Directional AC-DC Converters, a Cost Effective Alternative to Bi-Directional Converters"; IEEE; Aug. 2001; pp. 1911-1916.
Notification of Transmittal of the International Search Report dated Oct. 24, 2008 PCT/US2008/059681.
The International Search Report dated Oct. 24, 2008 PCT/US2008/059681.
Written Opinion of the International Searching Authority dated Oct. 24, 2008 PCT/US2008/059681.
Tero Viitanen, Heikki Tuusa, Space Vector Modulation and Control of a Unidirectional Three-Phase/Level/Switch VIENNA I Rectifier with LCL-type AC filter, 2003, pp. 1063-1064.
Roger Gules, Alexandre S. Martins and Ivo Barbi, A Switched-Mode Three-Phase Three-Level Telecommunications Rectifier, Department of Electrical Engineering, Power Electronics Institute, Florianopolis, SC, Brazil, pp. 1-7.
Notification Concerning Transmittal of International Preliminary Report on Patentability (Chapter 1 of the Patent Cooperation Treaty), PCT/US2008/059681 dated Nov. 5, 2009, 1 page.
Written Opinion of the International Searching Authority, PCT/US2008/059681 dated Nov. 5, 2009, 5 pages.

* cited by examiner

METHODS AND APPARATUS FOR THREE-PHASE RECTIFIER WITH LOWER VOLTAGE SWITCHES

STATEMENT REGARDING FEDERALLY SPONSORED RESEARCH

The Government may have certain rights in this application pursuant to Contract No. N00014-05-C-0202 and CREE Subcontract No. 06-003.

BACKGROUND

As is known in the art, rectifiers can be used to receive AC (alternating current) input signals and provide DC (direct current) output signals to energize a DC load. Rectifiers use one or more diodes to convert AC signals to DC signals. Half-wave rectifiers typically use one diode to block one-half of the AC waveform and pass the other half of the waveform. Multiple diodes can be used to provide full-wave rectification in which both the positive and negative cycles of the AC waveform are rectified. The full wave rectifier converts the input waveform to a DC output signal having a constant negative or positive polarity by reversing the negative (or positive) portions of the alternating current waveform.

For applications having three-phase operation, such as high voltage applications, six diodes can be used to provide the rectifier. Generally, three diode-pairs are used, one pair for each phase. For high voltage application, power factor correction may be required. Power factor correction can be provided using semiconductor switches to control conduction of the diodes. As the power ratings increase, the required voltage rating for semiconductor switches also increases. However, the voltage rating of the rectifier may be limited by the voltage rating of available switches used for power factor correction.

Figure 1:
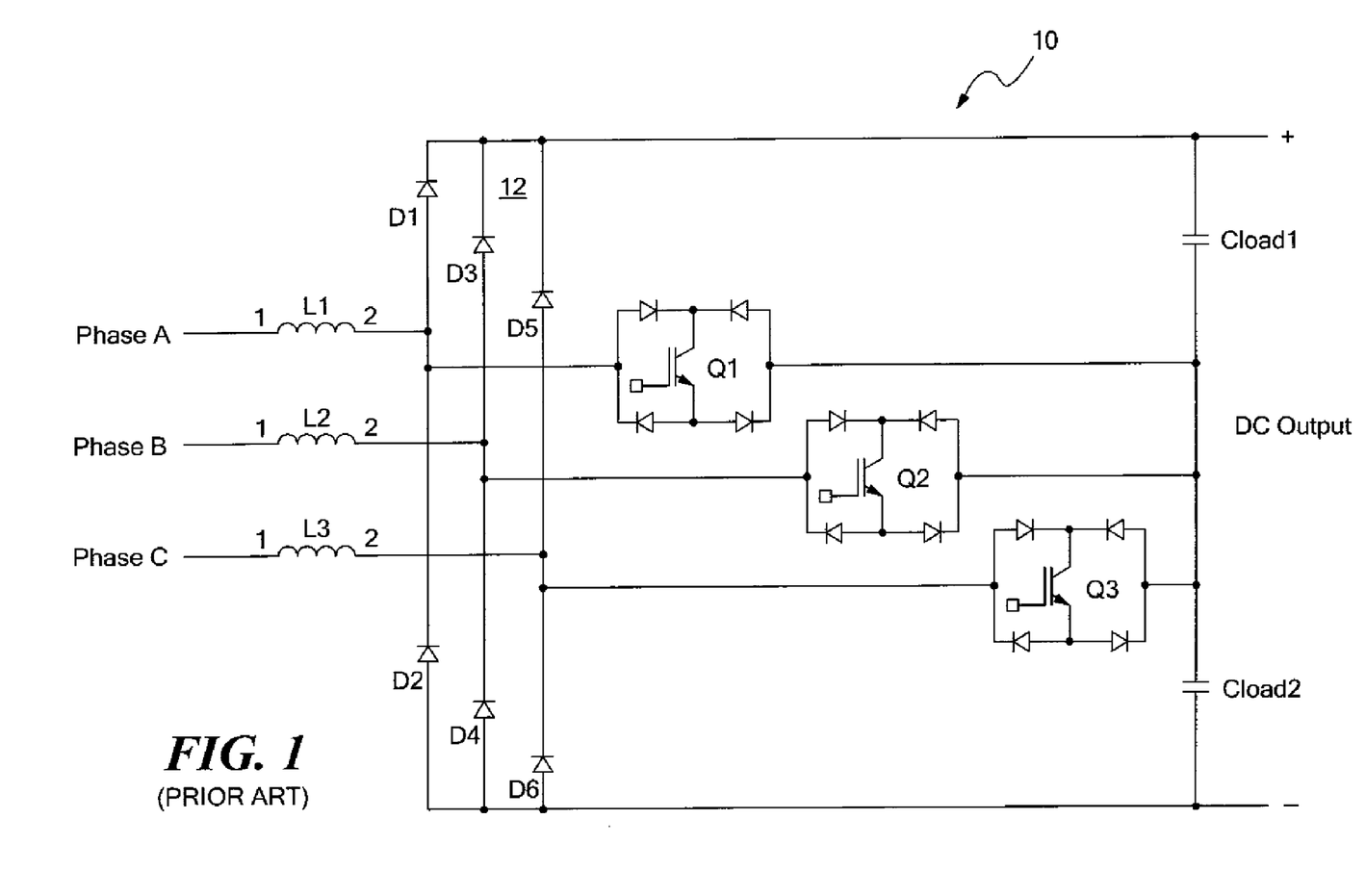
FIG. 1 is a schematic diagram of a prior art three-phase Vienna rectifier.

FIG. 1 shows a prior art high voltage rectifier 10 having power factor correction in an arrangement referred to in the art as a Vienna rectifier. Three phases A, B, C are provided to a diode bridge 12 to provide a DC output signal on first and second output capacitors Cload1, Cload2. Respective switches Q1, Q2, Q3, for each phase A, B, C switch the phases in a manner well known to one of ordinary skill in the art in accordance with operational requirements of the Vienna rectifier. If the desired DC output is 24,000 Volts, for example, each of the switches Q1, Q2, Q3, must be rated for at least 12,000 Volts. At present, practical switches carrying such voltages are not available.

SUMMARY

The present invention provides methods and apparatus for a rectifier, such as a three-phase rectifier, with series-coupled switches to enable the DC output voltage to be apportioned among multiple load capacitors. With this arrangement, the required power rating of the switches is significantly less than compared with conventional rectifiers.

In one aspect of the invention, a circuit comprises input terminals to receive three-phase power signals, a rectifier coupled to the input terminals and having DC output terminals, a series of terminal sets for respective load capacitors, the series of terminal sets coupled across the DC output terminals, a pair of series-coupled switches coupled to each of the input terminals to apportion voltage on the DC output terminals over the series of terminal sets for respective load capacitors.

In another aspect of the invention, a method comprises receiving three-phase power signals, rectifying the three-phase power signals to provide a DC output signal, controlling pairs of series-coupled switches coupled to each of the received three-phase signals to apportion voltage of the DC output signal among a series of load capacitors coupled across DC output terminals of the rectifier.

In a further aspect of the invention, a circuit comprises first, second and third input terminals to receive respective three phase power signals, a rectifier coupled to the three-phase power input terminals and having DC output terminals, the rectifier including a first pair of diodes coupled in series across the DC output terminals, a second pair of diodes coupled in series across the DC output terminals, and a third pair of diodes coupled in series across the DC output signals, the rectifier including a series of terminal pairs for load capacitors, a first switch pair coupled between the first input terminal and first and second ones of the series of terminal pairs for load capacitors, a second switch pair coupled between the second input terminal and the first and second ones of the series of terminal pairs for load capacitors, a third switch pair coupled between the third input terminal and the first and second ones of the series of terminal pairs for load capacitors, a fourth pair of diodes coupled in series across third and fourth ones of the series of terminal pairs for load capacitors, a point between diodes in the fourth pair of diodes being coupled to a point between switches in the first switch pair, a fifth pair of diodes coupled in series across the third and fourth ones of the series of terminal pairs for load capacitors, a point between diodes in the fifth pair of diodes being coupled to a point between switches in the second switch pair, a sixth pair of diodes coupled in series across the third and fourth ones of the series of terminal pairs for load capacitors, a point between diodes in the sixth pair of diodes being coupled to a point between switches in the third switch pair.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the invention provide methods and apparatus for a rectifier having a power factor that is not limited by the voltage rating of semiconductor switches as in conventional rectifier designs. While exemplary embodiments of the invention are primarily shown and described in conjunction with three-phase rectifiers, it is understood that other embodiments are contemplated in which a different number of phases are used, including a single phase.

Figure 2:
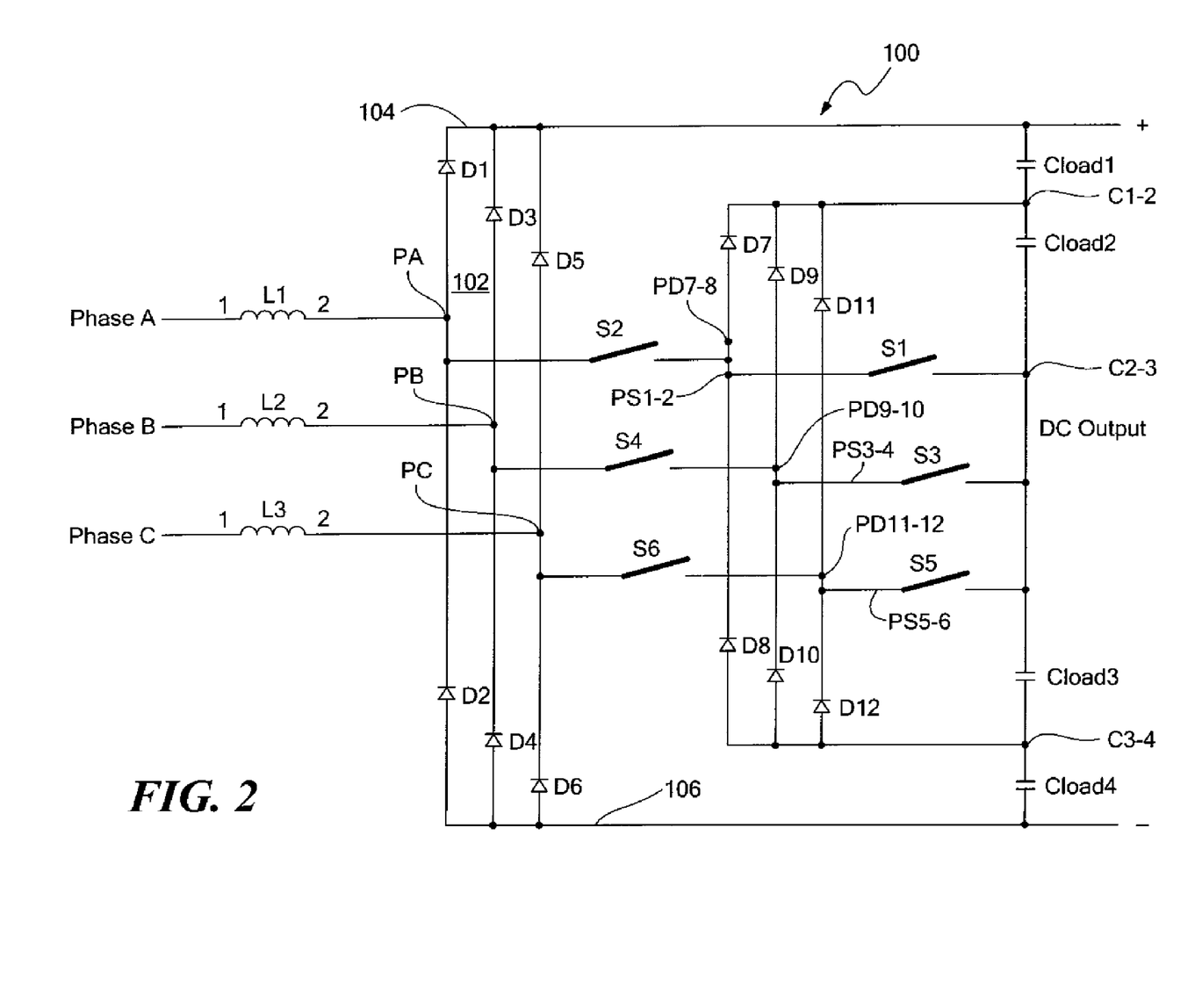
FIG. 2 is a block diagram of a rectifier circuit having power factor correction with series-connected semiconductors in accordance with exemplary embodiments of the invention.

FIG. 2 shows a three-phase rectifier 100 having three phase inputs A, B, C to a diode bridge 102 via a respective inductive element L1, L2, L3. First and second diodes D1, D2 are coupled end-to-end across the positive DC voltage rail 104 and the negative DC voltage rail 106. Similarly, third and fourth diodes D3, D4 are coupled end-to-end, and fifth and sixth diodes D5, D6 are coupled end-to-end across the voltage rails 104, 106. First, second, third, and fourth load capacitors Cload1, Cload2, Cload3, Cload4 are coupled in series across the voltage rails 104, 106.

The first phase signal A is connected, through L1, to a point PA between the first and second diodes D1, D2. Similarly, the second phase signal B is connected, through L2, to a point PB between the third and fourth diodes D3, D4 and the third phase C is connected, through L3, to a point PC between the fifth and sixth diodes D5, D6.

First and second switches S1, S2 are coupled in series between the first phase point PA and a point C2-3 between the second and third load capacitors Cload2, Cload3. Seventh and Eighth diodes D7, D8 are coupled end-to-end from a point C1-2 between the first and second load capacitors Cload1, Cload2 to a point C3-4 between the third and fourth load capacitors Cload3, Cload4. A point PD7-S between the seventh and eighth diodes D7, 98 is coupled to a point PS1-2 between the first and second switches S1, S2, Similar connections are provided for the second and third phases B, C. More particularly, third and fourth switches S3, S4 are coupled in series from the second phase point PB to the point C2-3 between the second and third load capacitors Cload2, Cload3, and ninth and tenth diodes D9, D10 coupled end-to-end between point C1-2 and a point C3-4 between the third and fourth load capacitors Cload3, Cload4 with a connection between a point PS3-4 between the third and fourth switches S3, S4 and a point PD9-10 between the ninth and tenth diodes D9, D10. Fifth and sixth switches S5, S6 are coupled in series from the third phase point PC to the point C2-3, eleventh and twelfth diodes D1, D12 are coupled end-to-end between the point C1-2 and the point C3-4, and a path connects a point PS5-6 between the fifth and sixth switches S5, S6 and a point PD11-12 between the eleventh and twelfth diodes D11, D12.

As noted above, a conventional rectifier provides a direct rectified 13.8 kV, three phase AC high power factor rectifier having semiconductor switches with ratings in the 12,000 V area. In the illustrated rectifier 100, the arrangement allows semiconductor switches with lower ratings, 6500 Volts for example, to be used by safely wiring them in series. Exemplary switches include appropriately rated Insulated Gate Bipolar Transistors (IGBT) from Eupec (e.g., part number FZ200R65KF1) and Mitsubishi (e.g., part number CM200HG-130H). It is understood that the impedance of the load capacitors can vary to meet the needs of a particular application. In one embodiment, the load capacitors are about 5 μF. In an alternative embodiment, 100 μF, 10 kV capacitors are used to enhance circuit function when a phase is lost.

In general, the circuit functions just as well for single phase with the capacitors being in the order of 5×-10× larger. With larger valued capacitors present, the circuit continues to operate with higher current in the remaining two phase wires but still as a sine wave (i.e., Power Factor Corrected). The output ripple is higher and at 2×f(line) or 120 Hz. The three phase circuit produces 6×f(line) or 360 Hz. Note that even though two phase wires were still connected, the exemplary circuit goes directly to single phase operation, i.e., no two phase operation. The circuit "sees" the vector sum of Phase B and Phase C when Phase A is opened.

The switches can be controlled by a gate drive circuit. In an exemplary embodiment, the gate drive to the series switches, S1 and S2, must be transformer coupled. The S1 gate and the S2 gate can share the same transformer since S1 and S2 are switched on and off at the same point in time. For reasons of efficiency the switching frequency should be low but inaudible. An exemplary range is 20-25 kHz at a fixed frequency.

The operation of the exemplary Vienna-type rectifier is a basic boost circuit. Thus, the DC output voltage (across the output capacitors) is higher than the peak of the AC input phase voltage. A slow acting feedback control loop (loop unity gain frequency <10Hz) is used regulate the DC output voltage.

The conduction time of each switch is programmed over a range of 0 to about 45 microseconds for a 20 kHz switching frequency, a total period being 50 microseconds. The actual conduction time or pulse width is controlled by a faster acting feedback control loop (loop unity gain frequency <2 kHz) which works to make the inductor current have a sinusoidal shape, the desired result for power factor correction (PFC).

The gate drive to S3 and S4 and the gate drive to S5 and S6 are each transformer coupled in the same fashion as the gate drive for S1 and S2. Separate control circuits are required for the faster acting feedback control but one slow acting feedback control can control all the switches and thereby regulate the common DC output voltage. The 20 kHz clock for the three faster acting feedback control circuits can be generated by the same source.

Figure 3:
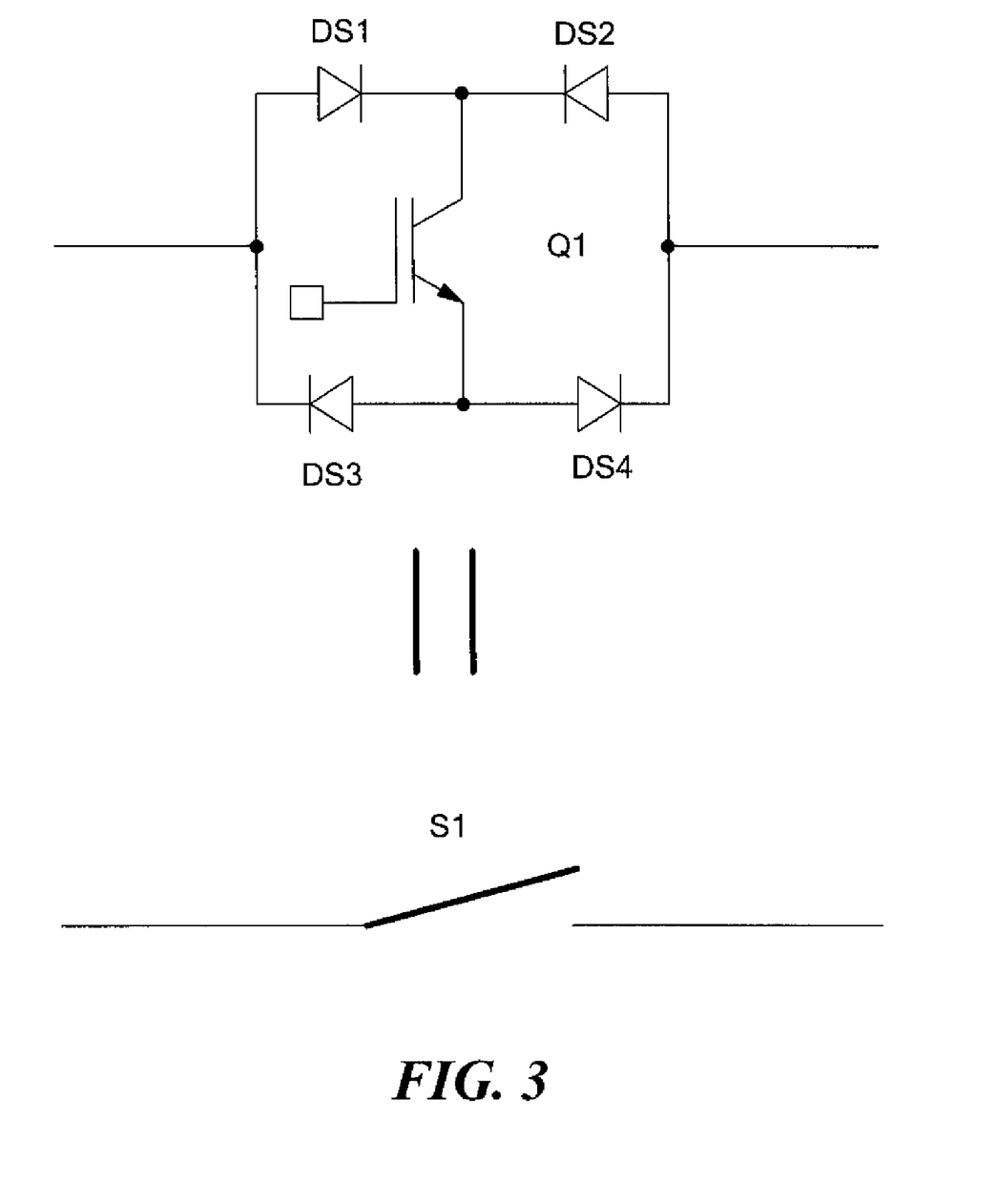
FIG. 3 is a schematic diagram of an exemplary switch configuration.

FIG. 3 shows an exemplary configuration for the switches, such as the first switch S1. A series of four diodes DS1, DS2, DS3, DS4 are coupled around the transistor switch Q1, which is shown as an IGBT (insulated gate bipolar transistor). More particularly, the first and fourth diodes DS1, DS4 provide a first current path through the transistor Q1 and the second and third diodes DS2, DS3 provide a second current path through the transistor Q1.

With this arrangement, if the DC Output is 24,000, for example, then the semiconductor switches Q1-Q6 need to be rated for only 6,000 Volts. It will be appreciated that since the switches do not need to support the entirety of the output voltage, a variety of switch types can be used to meet the needs of a particular application and voltage.

For the illustrated embodiment, in general, the rectifier 100 provides a five level rectifier circuit using the four output capacitors Cload1-Cload4, wired in series. If each capacitor is equally loaded, then they will each 'see' about one quarter of the output voltage. With a 3-phase input with 13.8 kV AC per phase, the nominal output voltage would be about 19 kV DC without power factor correction (PFC).

In other embodiments, for example a 200 kW system, it may prove to be more efficient to use four 50 kW converters, each wired across one of the four capacitors, Cload1-Cload4, thus wiring their inputs in series and their outputs in parallel. With this approach, a single control circuit can control all four converters thus forcing each of the four converters to have the same input current. And if each converter has the same input current, then wired with inputs in series, they will have equal input voltage.

Referring again to FIG. 2, the transistor switches Q1-Q6 are wired so that each sees about one quarter of the output voltage. Assuming a DC output voltage of 24,000 Volts, then the voltage at the junction of Cload2 and Cload3 will be about 12,000 Volts. The voltage at the junction of Cload2 and Cload1 will be at about 18,000 Volts.

When the first and second transistor switches Q1, Q2 are off and the voltage on the rectifier-side of the phase one inductor L1 is 24,000 Volts, the rectifier diode D1 will conduct the current in L1. The collector of the second switch Q2 will be within 1.0 Volt of the anode of diode D1. But the emitter of Q2 will be within 1.0 Volt of the junction of Cload2 and Cload1 because diode D7 will be conducting. Thus the voltage stress on Q2 will be about 6,000 Volts (24,000 minus 18,000) as desired. Similarly the collector of the first switch Q1 will be within 1.0 Volt of the anode of diode D7. But the emitter of Q1 will be within 1.0 Volt of the junction of Cload3 and Cload3. Thus the voltage stress on Q1 will be about 6,000 Volts (18,000 minus 12,000) as desired.

Some additional details on operation of the circuit of FIG. 2 are set forth below. In general, the rectifier 100 includes three boost circuits, one for each phase of a three phase power system operating together and sharing the same DC output load. In the diagrams below, only one phase is considered as the others will operate in the same fashion. It is assumed that the values of the capacitors are large enough that their voltage has a relatively small line frequency component. In addition a simplifying assumption is made that the three phase source is a wye connected source and that the center connection of the output capacitors is connected to the center of the wye through a low value resistor. A wye source is well known to one of ordinary skill in the art. When the other phases are reconnected, the other phases work to make the current in the low value resistor nearly zero, thereby allowing it to be removed from the circuit without effect.

Figure 4A:
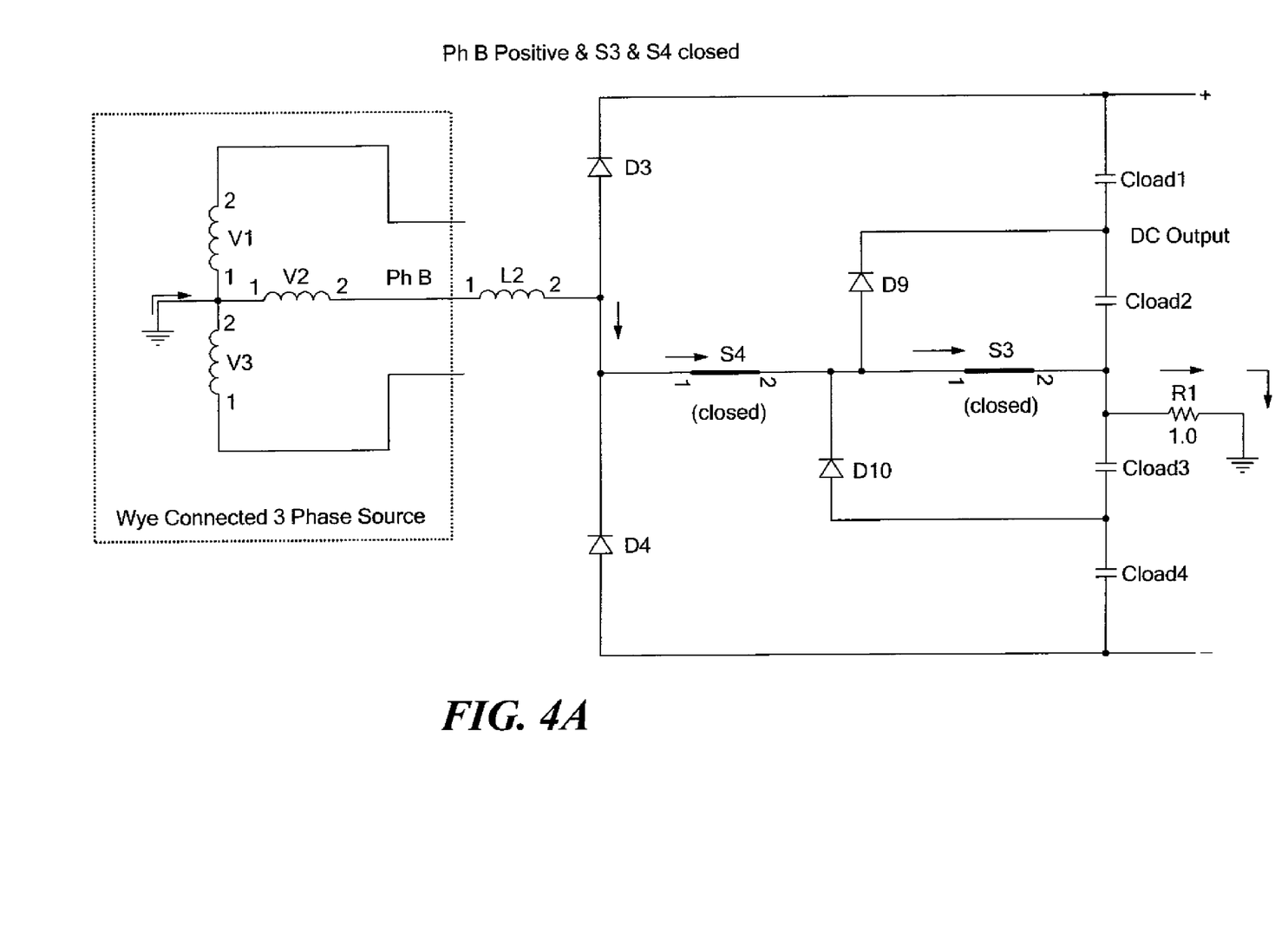
FIG. 4A is a circuit diagram showing a positive phase voltage and closed switch.

FIG. 4A is derived from the circuit of FIG. 2 focusing on active components for the second phase (B), where like reference designations indicate like elements. The bidirectional switches S3 and S4 are operated at 20 kHz or higher and the 3-phase source is line frequency, e.g., 50 or 60 Hz. Assume that the V2 pin 2 voltage Ph B is positive and rising and that the sum of the voltage across Cload1 and Cload2 is larger than the peak voltage of V2. Also assume that the load capacitors are each charged to about one quarter of the output voltage level. Start with S3 and S4 closed.

Current flows through inductor L2 and the switches S3 and S4 and into the junction of capacitors Cload2 and Cload3. Since the second phase inductor L2 has positive voltage present, the current will be rising.

Figure 4B:
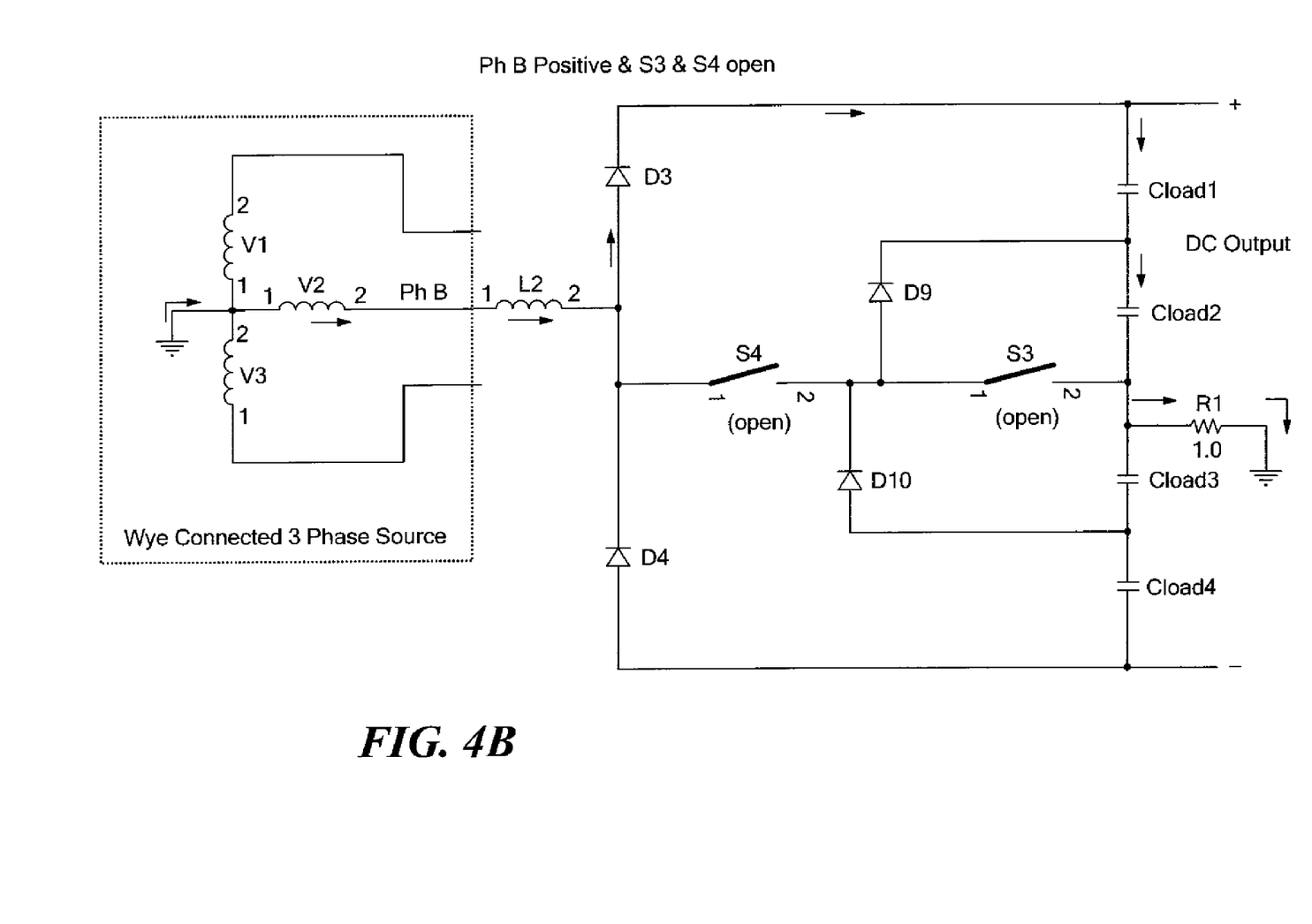
FIG. 4B is a circuit diagram showing a positive phase voltage and an open switch.

FIG. 4B shows the phase B voltage positive with the switches S3 and S4 open. The current in L2 continues to flow but through diode D3 and into capacitors Cload1 and Cload2. Negative voltage on L2 means that the current will be decreasing. So for the positive half of the Phase B sine wave of voltage, the duty factor of the switches S3 and S4 works to keep the sum of the voltages on Cload1 and Cload2 at a relatively fixed value. Note that the action of conducting diodes D3 and D9 work to limit the voltage on switch S4 to be no greater than the voltage on Cload1. Also the voltage on switch S3 is limited by D9 to be no greater than the voltage across Cload2. Since the voltage on the four capacitors is the same and equal to ¼ of the DC output voltage, the voltage on each switch can never be more than ¼ of the DC output voltage, as desired. It is understood that feedback can be employed to ensure that the voltage on Cload1 and Cload2 is regulated even as the Phase B voltage varies from zero to the positive peak of the sine wave and back to zero. The feedback also holds the C1 voltage constant when the DC load fluctuates. At the same time the faster feedback loop makes the current in L2 assume a sinusoidal, line frequency waveshape.

Figure 4C:
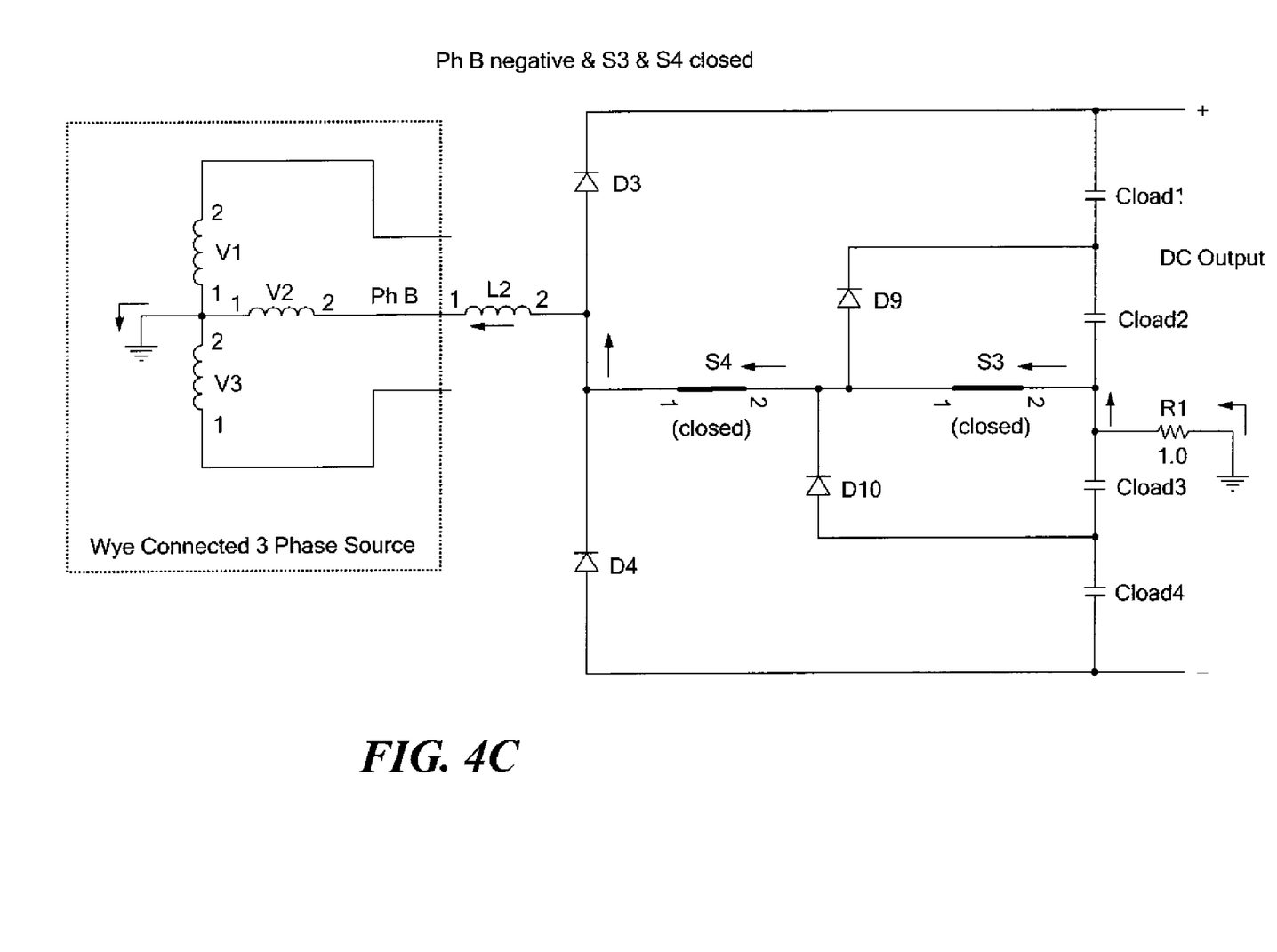
FIG. 4C is a circuit diagram showing a negative phase voltage and a closed switch.

FIG. 4C shows the phase B signal negative with the switches S3, S4 closed. Negative current flows through L2, S3, S4 and into the junction of capacitors Cload2 and Cload3. Since the second phase inductor L2 now has negative voltage present the negative current will be rising.

Figure 4D:
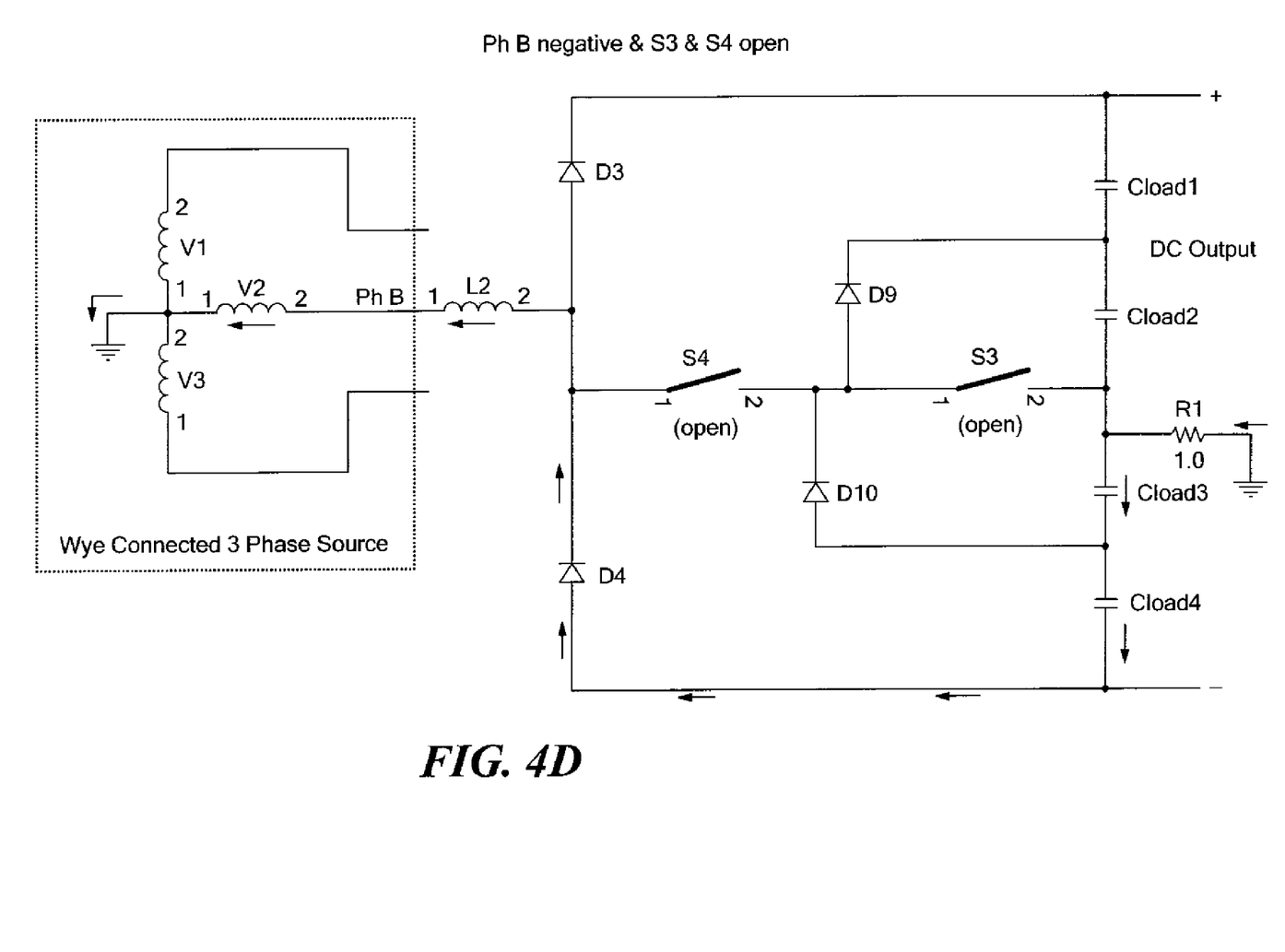
FIG. 4D is a circuit diagram showing a negative phase voltage and an open switch.

FIG. 4D shows the phase B signal negative and the switches S3 and S4 open. The current in L2 continues to flow but now through D4 and into Cload4 and Cload3. Negative voltage on L2 means that the current will be decreasing. Similarly, for the negative half of the Phase B sine wave of voltage, the duty factor of the switches S3 and S4 works to keep the sum of the voltages on Cload3 and Cload4 at a relatively fixed value. Note that the action of conducting diodes D4 and D10 work to limit the voltage on switch S4 to be no greater than the voltage on Cload4. Also the voltage on switch S3 is limited by diode D10 to be no greater than the voltage across Cload3. Since the voltage on the four capacitors is the same and equal to about one quarter of the DC output voltage, the voltage on each switch can never be more than one quarter of the DC output voltage, as desired. Again feedback can be employed to ensure that the voltage on Cload3 and Cload4 is regulated even as the Phase B voltage varies from zero to the negative peak of the sine wave and back to zero. The feedback also holds the C2 voltage constant when the DC load fluctuates. At the same time the faster feedback loop makes the current in L2 assume a sinusoidal, line frequency waveshape.

Because the values of Cload1-Cload4 are relatively large, one slow responding feedback loop is needed to hold the sum of the voltages on Cload1-Cload4 constant. Additional feedback can be employed to ensure that the current in L2 approximates a line frequency sine wave. By forcing the AC input currents to be line frequency sine waves, the line frequency harmonic content of the line currents will be relatively low.

Figure 5:
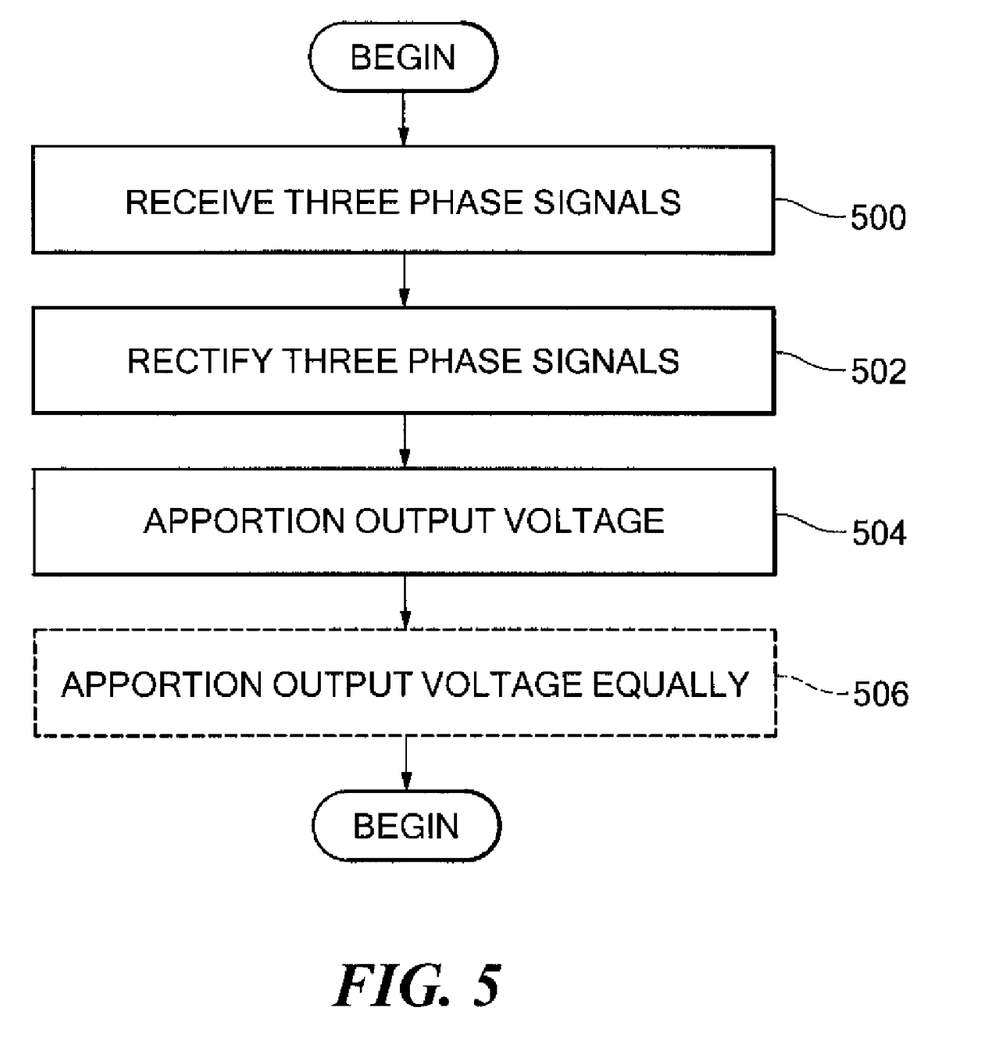
FIG. 5 is a flow diagram showing an exemplary sequence of steps to provide a rectifier in accordance with exemplary embodiments of the invention.

FIG. 5 shows an exemplary sequence of steps to provide voltage rectification in accordance exemplary embodiments of the invention. In step 500, three-phase signals are received and in step 502, the signals are rectified to provide a DC output signal. In step 504, pairs of series-coupled switches coupled to each of the received three-phase signals are controlled to apportion voltage of the DC output signal among a series of load capacitors coupled across DC output terminals of the rectifier. In optional step 506, the rectifier output voltage is apportioned approximately equally among the load capacitors.

While exemplary embodiments shown and described herein are directed to three-phase operation with particular load capacitor arrangements, it is understood that additional load capacitors, additional phases, and additional diode configurations can be used to meet the needs of a particular application.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A circuit, comprising:
   first, second, and third input terminals to receive respective first, second, and third phase signals for three-phase power signals;
   a diode bridge coupled to the first, second, and third input terminals and having DC output terminals;
   a series of terminal sets for respective load capacitors, the series of terminal sets coupled across the DC output terminals;

a first pair of series-coupled switches having a first end coupled to the first input terminal to receive the first phase signal and a second end coupled to a DC output voltage terminal;

a second pair of series-coupled switches having a first end coupled to a second input terminal to receive the second phase signal and a second end coupled to the DC output voltage terminal;

a third pair of series-coupled switches having a first end coupled to the third input terminal to receive the third phase signal and a second end coupled to the DC output voltage terminal, and a first pair of series-coupled diodes, a second pair of series-coupled diodes, and a third pair of series-coupled diodes, the first, second, and third pairs of series-coupled diodes coupled in parallel, wherein diodes in the first pair of series-coupled diodes are coupled cathode to anode, diodes in the second pair of series-coupled diodes are coupled cathode to anode, and diodes in the third pair of series-coupled diodes are coupled cathode to anode, wherein a first node is located between diodes in the first pair of series-coupled diodes and between switches in the first pair of series-coupled switches, a second node is located between diodes in the second pair of series-coupled diodes and between switches in the second pair of series-coupled switches, and a third node is located between diodes in the third pair of series-coupled diodes and between switches in the third pair of series-coupled switches wherein the first, second, and third pairs of series-coupled diodes include a first end directly connected to a point between first and second load capacitor terminal pairs, and a second end directly connected to a point between third and fourth load capacitor terminal pairs.

2. The circuit according to claim 1, wherein the series of terminal sets includes at least four pairs of terminals each for coupling to a respective load capacitor.

3. The circuit according to claim 2, wherein the switches can support a DC output voltage of at least 24,000V.

4. The circuit according to claim 2, further including the load capacitors connected to the respective terminal sets, wherein the load capacitor impedance values are selected to apportion the DC output voltage substantially equally among the four load capacitors.

5. The circuit according to claim 1, wherein each of the switches is coupled to a network of diodes to provide first and second paths through the switch.

6. The circuit according to claim 1, wherein the diode bridge functions when one of the three phases is not present.

7. The circuit according to claim 1, wherein switches in the first, second, and third pairs of series-coupled switches are controlled to boost the first, second and third phase signals and to have the circuit draw a sinusoidal input current for the first, second, and third phase signals for power factor correction.

8. A method, comprising:
receiving three-phase power signals on respective first, second, and third input terminals;
rectifying the three-phase power signals to provide a DC output signal;
employing a first pair of series-coupled switches having a first end coupled to the first input terminal to receive a first phase signal and a second end coupled to a DC output voltage terminal;
employing a second pair of series-coupled switches having a first end coupled to a second input terminal to receive a second phase signal and a second end coupled to the DC output voltage terminal;

employing a third pair of series-coupled switches having a first end coupled to the third input terminal to receive a third phase signal and a second end coupled to the DC output voltage terminal, and employing a first pair of series-coupled diodes, a second pair of series-coupled diodes, and a third pair of series-coupled diodes, the first, second, and third pairs of series-coupled diodes coupled in parallel, wherein diodes in the first pair of series-coupled diodes are coupled cathode to anode, diodes in the second pair of series-coupled diodes are coupled cathode to anode, and diodes in the third pair of series-coupled diodes are coupled cathode to anode, wherein a first node is located between diodes in the first pair of series-coupled diodes and between switches in the first pair of series-coupled switches, a second node is located between diodes in the second pair of series-coupled diodes and between switches in the second pair of series-coupled switches, and a third node is located between diodes in the third pair of series-coupled diodes and between switches in the third pair of series-coupled switche's, wherein the first, second, and third pairs of series-coupled diodes include a first end directly connected to a point between first and second load capacitor terminal pairs, and a second end directly connected to a point between third and fourth load capacitor terminal pairs.

9. The method according to claim 8, further including apportioning the voltage approximately equally among the load capacitors.

10. The method according to claim 8, wherein the series of load capacitors includes four load capacitors.

11. The method according to claim 8, wherein the rectifier provides a direct rectified voltage of at least 24 kV.

12. The method according to claim 11, wherein the load capacitors are in the order of about 5 µF.

13. The method according to claim 8, further including utilizing a switching frequency of between about 20-25 kHZ.

14. The method according to claim 8, further including selecting the switches with a voltage rating that is about one quarter of a DC output voltage of the rectifier.

15. The circuit according to claim 8, wherein switches in the first, second, and third pairs of series-coupled switches are controlled to boost the first, second and third phase signals and to have the circuit draw a sinusoidal input current for the first, second, and third phase signals for power factor correction.

16. The method according to claim 8, wherein the diode bridge functions when one of the three phases is not present.

17. A circuit, comprising:
a rectifier having first and second DC output terminals;
a circuit path coupled across the DC output terminals, the circuit path including first terminals for a first load capacitor, second terminals for a second load capacitor, third terminals for a third load capacitor, and fourth terminals for a fourth load capacitor;
a first input terminal to receive a phase A signal coupled to the rectifier;
a second input terminal to receive a phase B signal coupled to the rectifier;
a third input terminal to receive a phase C signal coupled to the rectifier the rectifier including a first pair of series-coupled diodes coupled across the DC output terminals, a second pair of series-coupled diodes coupled across the DC output terminals, and a third pair of series-coupled diodes coupled across the DC output terminals, wherein the first input terminal is coupled to a point between diodes in the first pair of series-coupled diodes, the second input terminal is coupled to a point between diodes in the second pair of series-coupled diodes, and the third input terminal is coupled to a point between the third pair of series-coupled diodes;

a first switch pair coupled between the first input terminal and a point between the second terminals for the second load capacitor and the third terminals for the third load capacitor;

a second switch pair coupled between the second input terminal and the point between the second terminals for the second load capacitor and the third terminals for the third load capacitor;

a third switch pair coupled between the third input terminal and the point between the terminals for the second load capacitor and the third terminals for the third load capacitor;

a fourth pair of series-coupled diodes directly connected at a first end to a point between the first terminals for the first load capacitor and the second terminals for the second load capacitor and directly connected at a second end to a point between the third terminals for the third load capacitor and the fourth terminals for the fourth load capacitor, wherein a first node is located between diodes in the fourth pair of series-coupled diodes and switches in the first switch pair;

a fifth pair of series-coupled diodes directly connected at a first end to a point between the first terminals for the first load capacitor and the second terminals for the second load capacitor and directly connected at a second end to a point between the third terminals for the third load capacitor and the fourth terminals for the fourth load capacitor, wherein a second node is located between diodes in the fifth pair of series-coupled diodes and switches in the second switch pair;

a sixth pair of series-coupled diodes directly connected at a first end to a point between the first terminals for the first load capacitor and the second terminals for the second load capacitor and directly connected at a second end to a point between the third terminals for the third load capacitor and the fourth terminals for the fourth load capacitor, wherein a third node is located between diodes in the sixth pair of series-coupled diodes and switches in the third switch pair.

18. The circuit according to claim 17, wherein the rectifier functions when one of the three phases is not present.

19. The circuit according to claim 18, wherein the rectifier draws a sinusoidal current when one of the three phases is not present.

* * * * *

UNITED STATES PATENT AND TRADEMARK OFFICE
CERTIFICATE OF CORRECTION

| | | |
|---|---|---|
| PATENT NO. | : 7,751,212 B2 | Page 1 of 1 |
| APPLICATION NO. | : 11/738660 | |
| DATED | : July 6, 2010 | |
| INVENTOR(S) | : Joseph C. Perkinson | |

It is certified that error appears in the above-identified patent and that said Letters Patent is hereby corrected as shown below:

Column 3, line 26 delete "PD7-S" and replace with --PD7-8--.

Column 3 line 29 delete ", 98" and replace with --, D8--.

Column 3, line 40 delete "D1," and replace with --D11,--.

Column 5, line 11 delete "Cload3 and Cload3." and replace with --Cload2 and Cload3--.

Column 6, line 34 delete "accordance exemplary" and replace with --accordance with exemplary--.

Column 8, line 23 delete "switche's," and replace with --switches,--.

Signed and Sealed this
Fifteenth Day of February, 2011

David J. Kappos
*Director of the United States Patent and Trademark Office*